(12) United States Patent
You et al.

(10) Patent No.: US 8,121,654 B2
(45) Date of Patent: Feb. 21, 2012

(54) APPARATUS AND METHOD FOR REMOVING AN ECHO SIGNAL IN A SIGNAL TRANSMISSION/RECEPTION APPARATUS OF A COMMUNICATION SYSTEM

(75) Inventors: Hwa-Sun You, Suwon-si (KR); Jae-Bum Kim, Seoul (KR); Hee-Won Kang, Seongnam-si (KR); Jung-Woo Ku, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 12/324,506

(22) Filed: Nov. 26, 2008

(65) Prior Publication Data

US 2009/0149130 A1     Jun. 11, 2009

(30) Foreign Application Priority Data

Dec. 7, 2007     (KR) .................. 10-2007-0127179

(51) Int. Cl.
*H04B 15/00* (2006.01)

(52) U.S. Cl. ....... 455/570; 455/63.1; 370/286; 370/287; 370/292; 379/406.01; 379/406.1; 379/406.13

(58) Field of Classification Search ................. 455/63.1, 455/570; 370/286–292; 379/406.01–406.16
See application file for complete search history.

(56) References Cited

U.S. PATENT DOCUMENTS

| | | | | |
|---|---|---|---|---|
| 4,757,527 A | * | 7/1988 | Beniston et al. | 379/406.09 |
| 6,961,423 B2 | * | 11/2005 | Pessoa et al. | 379/406.08 |
| 6,980,644 B1 | * | 12/2005 | Sallaway et al. | 379/391 |
| 7,242,762 B2 | * | 7/2007 | He et al. | 379/406.08 |
| 7,428,265 B1 | * | 9/2008 | Adireddy et al. | 375/233 |
| 2008/0205661 A1 | | 8/2008 | Kim et al. | |
| 2009/0147964 A1 | * | 6/2009 | You et al. | 381/66 |
| 2009/0215390 A1 | * | 8/2009 | Ku et al. | 455/23 |

FOREIGN PATENT DOCUMENTS

| | | |
|---|---|---|
| JP | 08-084105 A | 3/1996 |
| JP | 2003-087217 A | 3/2003 |
| JP | 2004-080668 A | 3/2004 |
| JP | 2007-020099 A | 1/2007 |
| KR | 10-2005-0011661 A | 1/2005 |
| KR | 10-2006-0062761 A | 6/2006 |
| KR | 10-0758206 B1 | 9/2007 |
| WO | 2005/008916 A1 | 1/2005 |

* cited by examiner

*Primary Examiner* — Patrick O'Neill

(74) *Attorney, Agent, or Firm* — Jefferson IP Law, LLP

(57) ABSTRACT

A method and apparatus for removing an echo signal in a signal transmission/reception apparatus of a communication system is provided. A signal transmission/reception apparatus estimates an input channel response using a training sequence, generates a first signal by removing the input channel response from a first reception signal, detects an echo channel impulse response using the first signal, detects an echo signal removing coefficient using the echo channel impulse response, generates a second signal in which an echo signal is removed by applying the echo signal removing coefficient to a second reception signal, and removes the second signal from a third signal, wherein the first signal is received prior to receiving the second signal and the second signal is received prior to receiving the third signal.

16 Claims, 4 Drawing Sheets

APPARATUS AND METHOD FOR REMOVING AN ECHO SIGNAL IN A SIGNAL TRANSMISSION/RECEPTION APPARATUS OF A COMMUNICATION SYSTEM

PRIORITY

This application claims the benefit under 35 U.S.C. §119 (a) of a Korean patent application filed in the Korean Intellectual Property Office on Dec. 7, 2007 and assigned Serial No. 10-2007-0127179, the entire disclosure of which is hereby incorporated by reference.

BACKGROUND OF THE INVENTION

1. Field of the Invention

The present invention relates to an apparatus and method for transmitting/receiving a signal in a signal transmission/reception apparatus of a communication system. More particularly, the present invention relates to an apparatus and method for transmitting/receiving a signal after removing an echo signal in a signal transmission/reception apparatus of a communication system.

2. Description of the Related Art

In a conventional communication system, a signal is transmitted/received through a direct link between a Base Station (BS) and a Mobile Station (MS). However, in the conventional communication system, a location of the BS is fixed, so it is difficult to supply an effective communication service when there is a shadow region in a service area or when there is significant variation of a channel state. Therefore, in the conventional communication system, a Relay Station (RS) is used for amplifying a BS signal and extending a service area of a BS.

The conventional communication system can extend a cell service area and provide a channel with a better channel state to an MS using the RS. Further, the BS can provide a faster data channel to an MS using the RS in a cell boundary region that experiences a poor channel state.

FIG. 1 is a diagram illustrating a structure of a conventional communication system using an RS.

Referring to FIG. 1, the conventional communication system includes a BS 110, an RS 130, and an MS 150.

The BS 110 can directly transmit data to the MS 150, and can transmit data to the MS 150 using the RS 130. The MS 150 can directly transmit data to the BS 110, and can transmit data to the BS 110 using the RS 130.

The RS 130 amplifies a signal received from the BS 110, and transmits the amplified signal to the MS 150. The RS 130 amplifies a signal received from the MS 110, and transmits the amplified signal to the BS 150. Further, the RS 130 includes at least one antenna for transmitting/receiving a signal.

Referring to FIG. 1, it will be assumed that the RS 130 includes two antennas, i.e., a transmission antenna for transmitting a signal and a reception antenna for receiving a signal.

Because the RS 130 transmits/receives signals, a signal transmitted through the transmission antenna of the RS 130 can be received by the reception antenna of the RS 130. The signal transmitted through the transmission antenna of the RS 130 that is received by the reception antenna of the RS 130 is referred to as an "echo signal".

The echo signal results in the occurrence of oscillation in the RS 130. In addition, the signal received through the reception antenna is distorted due to the echo signal. When the signal received through the reception antenna is distorted, the quality of a signal transmitted by the RS 130 is decreased.

Therefore, there is a need for a signal transmission/reception apparatus that removes an echo signal in order to prevent a decrease in quality of a transmission signal due to the echo signal in the conventional communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for removing an echo signal in a signal transmission/reception apparatus of a communication system.

Another aspect of the present invention is to provide an apparatus and method for removing an echo signal in order to prevent a decrease in quality of a transmission signal in a signal transmission/reception apparatus of a communication system.

A further aspect of the present invention is to provide an apparatus and method for transmitting/receiving a signal after removing an echo signal in a signal transmission/reception apparatus of a communication system.

In accordance with an aspect of the present invention, a method for removing an echo signal in a signal transmission/reception apparatus of a communication system is provided. The method includes estimating an input channel response using a training sequence, generating a first signal by removing the input channel response from a first reception signal, detecting an echo channel impulse response using the first signal, detecting an echo signal removing coefficient using the echo channel impulse response, generating a second signal in which an echo signal is removed by applying the echo signal removing coefficient to a second reception signal, removing the second signal from a third signal, wherein the first signal is received prior to receiving the second signal and the second signal is received prior to receiving the third signal.

In accordance with another aspect of the present invention, an apparatus to remove an echo signal in a signal transmission/reception apparatus of a communication system is provided. The apparatus includes an input channel estimator to estimate an input channel response using a training sequence, a first mixer to generate a first signal by removing the input channel response from a first reception signal, an echo channel estimator to detect an echo channel impulse response using the first signal, and detect an echo signal removing coefficient using the echo channel impulse response, an echo signal remover to generate a second signal in which an echo signal is removed by applying the echo signal removing coefficient to a second reception signal, and a second mixer to remove the second signal from a third signal, wherein the first signal is received prior to receiving the second signal and the second signal is received prior to receiving the third signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for removing an echo signal in a signal transmission/reception apparatus of a communication system. Exemplary embodiments of the present invention also provide an apparatus and method for removing an echo signal to prevent a decrease in quality of a transmission signal in a signal transmission/reception apparatus of a communication system. Further, exemplary embodiments of the present invention provide an apparatus and method for transmitting/receiving a signal after removing an echo signal in a signal transmission/reception apparatus of a communication system.

In exemplary embodiments of the present invention, a signal transmission/reception apparatus of a communication system uses at least one antenna for transmitting/receiving a signal. Hereinafter, it will be assumed that the signal transmission/reception apparatus of a communication system uses two antennas, i.e., a transmission antenna and a reception antenna.

Although a description of exemplary embodiments of the present invention will be given herein with reference to a Relay Station (RS) as an example of the signal transmission/reception apparatus, the present invention may be used not only in the RS but also in other signal transmission/reception apparatus in which an echo signal may occur. Herein, the RS relays signals between a Base Station (BS) and a Mobile Station (MS).

Figure 1:
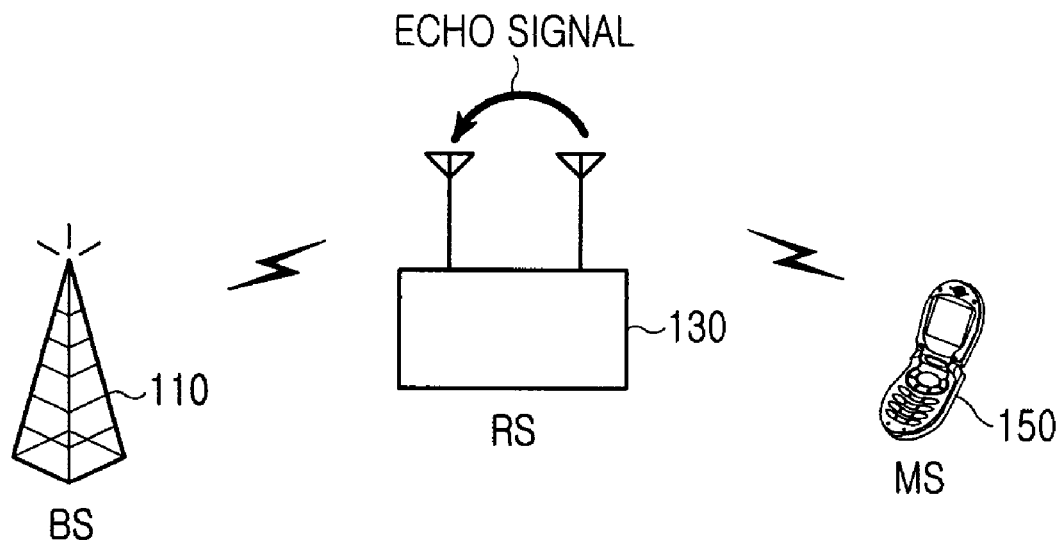
FIG. 1 is a diagram illustrating a structure of a conventional communication system using an RS.

First, a structure of a communication system, according to an exemplary embodiment of the present invention, is identical to a structure of a communication system as illustrated in FIG. 1, so a detailed description thereof will be omitted herein.

Figure 2:
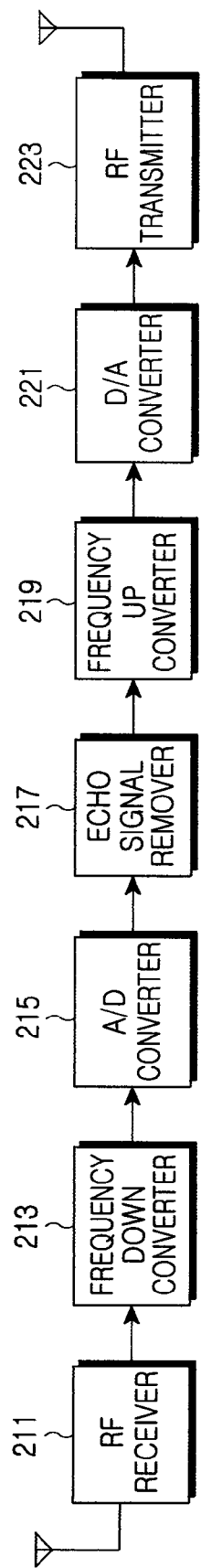
FIG. 2 is a diagram illustrating a structure of a signal transmission/reception apparatus of a communication system according to an exemplary embodiment of the present invention.

FIG. 2 is a diagram illustrating a structure of a signal transmission/reception apparatus of a communication system according to an exemplary embodiment of the present invention.

Referring to FIG. 2, the signal transmission/reception apparatus includes a Radio Frequency (RF) receiver 211, a frequency down converter 213, an Analog to Digital converter (A/D converter) 215, an echo signal remover 217, a frequency up converter 219, a Digital to Analog converter (D/A converter) 221, and an RF transmitter 223.

If the signal transmission/reception apparatus is an RS, the RS may transmit a signal received from a BS to an MS, and transmit a signal received from the MS to the BS.

The RF receiver 211 is connected to a reception antenna, receives a signal using the reception antenna, and outputs the received signal to the frequency down converter 213.

The frequency down converter 213 down converts the signal output from the RF receiver 211 into a base band signal or an Inter Frequency (IF) band signal, and outputs the frequency down converted signal to the A/D converter 215.

The A/D converter 215 converts the frequency down converted signal from an analog signal into a digital signal, and outputs the digital signal to the echo signal remover 217.

The echo signal remover 217 acquires an echo channel response by extracting a training sequence from the digital signal, and acquires an echo channel response coefficient using the acquired echo channel response. The echo signal remover 217 removes an echo signal included in the received signal using an echo channel removing coefficient filter according to the echo channel response coefficient, and outputs the signal, with the echo signal removed, to the frequency up converter 219.

An exemplary structure of an echo signal remover 217 will be described below.

The frequency up converter 219 up converts the signal output from the echo signal remover 217, and outputs the up converted signal to the D/A converter 221.

The D/A converter 221 converts the up converted signal as a digital signal into an analog signal, and outputs the analog signal to the RF transmitter 223.

The RF transmitter 223 transmits the analog signal using a transmission antenna.

Figure 3:
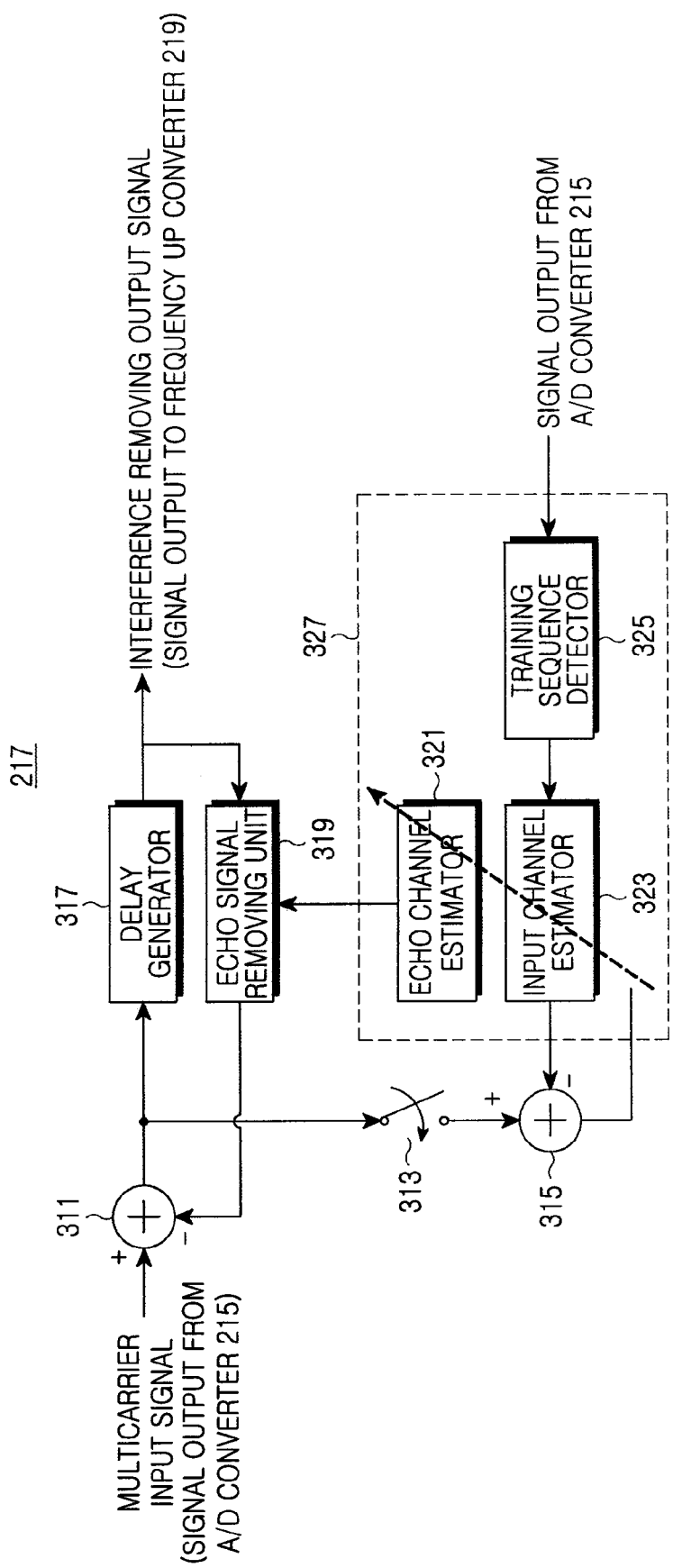
FIG. 3 is a diagram illustrating a structure of an echo signal remover according to an exemplary embodiment of the present invention.

FIG. 3 is a diagram illustrating a structure of an echo signal remover according to an exemplary embodiment of the present invention.

Referring to FIG. 3, the echo signal remover 217 includes a first mixer 311, a switch 313, a second mixer 315, a delay generator 317, an echo signal removing unit 319, and an echo channel coefficient generator 327.

The echo channel coefficient generator 327 includes an echo channel estimator 321, an input channel estimator 323, and a training sequence detector 325.

The first mixer 311 removes a signal output from the echo signal removing unit 319 from an input signal, i.e., a signal output from the A/D converter 215, and outputs the signal, in which the signal output from the echo signal removing unit 319 is removed, to the delay generator 317.

The delay generator 317 delays the signal output from the first mixer 311 according to a preset time, and outputs the delayed signal. Here, the preset time is determined according to a preset delay value.

The training sequence detector 325 may detect or acquire a training sequence using an input signal, for example, the signal output from the A/D converter 215. Herein, the training sequence is a discrete time training sequence that occurred according to a sampling frequency. For example, the training sequence may include a preamble sequence, a midamble sequence, and a postamble sequence.

The input channel estimator 323 filters the training sequence generated by the training sequence detector 325 using an input channel estimation filter included in the input channel estimator 323.

In this case, an output of the input channel estimation filter may be expressed by Equation (1) below.

$$\hat{x}[n] = \sum_{m=0}^{L_h} \hat{h}[m]s[n-m] \quad (1)$$

In Equation (1), n represents a current time index, m represents an impulse response index of the input channel estimation filter, s[n] represents a reference training sequence used in a current sample, ĥ[m] represents a coefficient of the input channel estimation filter consisted of $L_h+1$ taps, and x̂[n] represents an input channel response of the input channel estimation filter.

The switch 313 switches the signal output from the first mixer 311 to the second mixer 315 using a controller (not shown) included in the RS.

The second mixer 315 removes the input channel response output from the input channel estimator 323 from a signal switched through the switch 313.

The echo channel estimator 321 estimates an echo channel using the signal output from the second mixer 315. The echo channel estimator 321 may be simplified in the form of a complex gain, or may be implemented in the form of a filter structure when it will be assumed that a multipath component is ignored.

The echo channel estimator 321 removes an input signal using the training sequence. Here, the echo channel estimator 321 may extract an echo signal component by removing the input signal, and may estimate an echo channel without considering a correlation relationship of a signal.

The echo channel estimator 321 acquires an echo signal removing coefficient using the estimated echo channel, i.e., an echo channel impulse response.

The echo signal removing unit 319 receives a signal delayed by the delay generator 317 and the echo signal removing coefficient, and acquires an echo signal removing filter response using the echo signal removing coefficient.

The echo signal removing unit 319 may include a filter for removing an echo signal, and removes an echo signal by applying the echo signal removing coefficient to the echo signal removing filter. Here, the echo signal removing coefficient is an estimated value of the echo channel impulse response.

In this case, an operation of the echo signal remover 217 in a training sequence time duration may be expressed by Equation (2) below.

$$y[n] = \sum_{m=0}^{L_f} (f[m] - \hat{f}[m])y[n-d-m] + (x[n] - \hat{x}[n]) + w[n] \quad (2)$$

In Equation (2), n represents a current time index, y[n] represents an output of the echo signal remover 217, m represents an impulse response index of the echo signal removing filter, f[m] represents an impulse response of an echo channel, and f̂[m] represents an output of the echo signal removing filter with a length $L_f$. Herein, the echo signal removing filter uses the estimation value of the echo channel impulse response. In addition, w[n] represents a noise additionally received in an input side of the RS as an additive noise, and d represents a delay value of the delay generator 317.

As expressed in Equation (2), if each of the echo channel estimator 321 and the input channel estimator 323 perfectly estimates a corresponding channel, the output of the echo signal remover 217 includes only the additive noise w[n]. Hereinafter, the output of the echo signal remover 217 will be referred to as an 'interference removing output signal'.

Therefore, the echo signal remover 217 may estimate an echo channel and an input channel filter coefficient to minimize a power sum of the interference removing output signal or an average power of the interference removing output signal using one of a Least Square Estimation (LSE) scheme, and a Minimum Mean Square Error Estimation (MMSE) scheme, etc.

In addition, the echo signal remover 217 may use an adaptive algorithm to estimate the echo channel and input channel filter coefficient in a real time. Here, the adaptive algorithm may be one of a Least Mean Square (LMS) algorithm, a Recursive Least Square (RLS) algorithm, etc.

The signal transmission/reception apparatus, i.e., the RS applies the estimated echo channel response for the training sequence time duration to a time duration except for the training sequence time duration when a time variant characteristic of the echo channel is equal to or less than a threshold time variant characteristic.

In this case, the RS transmits an interference removing output signal expressed by Equation (3) below.

$$y[n] = \sum_{m=0}^{L_f} (f[m] - \hat{f}[m])y[n-d-m] + x[n] + w[n] \quad (3)$$

When an echo channel is perfectly estimated, there is no interference that occurs due to an echo signal. Therefore, in the RS, a multi carrier input signal x[n] and an additive noise occurs according to the transmission of the multi carrier input signal x[n].

On the other hand, if it is not possible to ignore the time variant characteristic of the echo channel because there is a plurality of mobile dispersion objects near the RS, that is, if the time variant characteristic of the echo channel is greater than the threshold time variant characteristic, a quality of the interference removing output signal may become worse due to a channel variance between the training sequence time duration and the time duration except for the training sequence time duration.

To prevent a case from occurring where the quality of the interference removing output signal becomes worse due to the channel variance between the training sequence time duration and the time duration except for the training sequence time duration, the RS may determine a current echo channel impulse response using previous echo channel estimation values.

Figure 4:
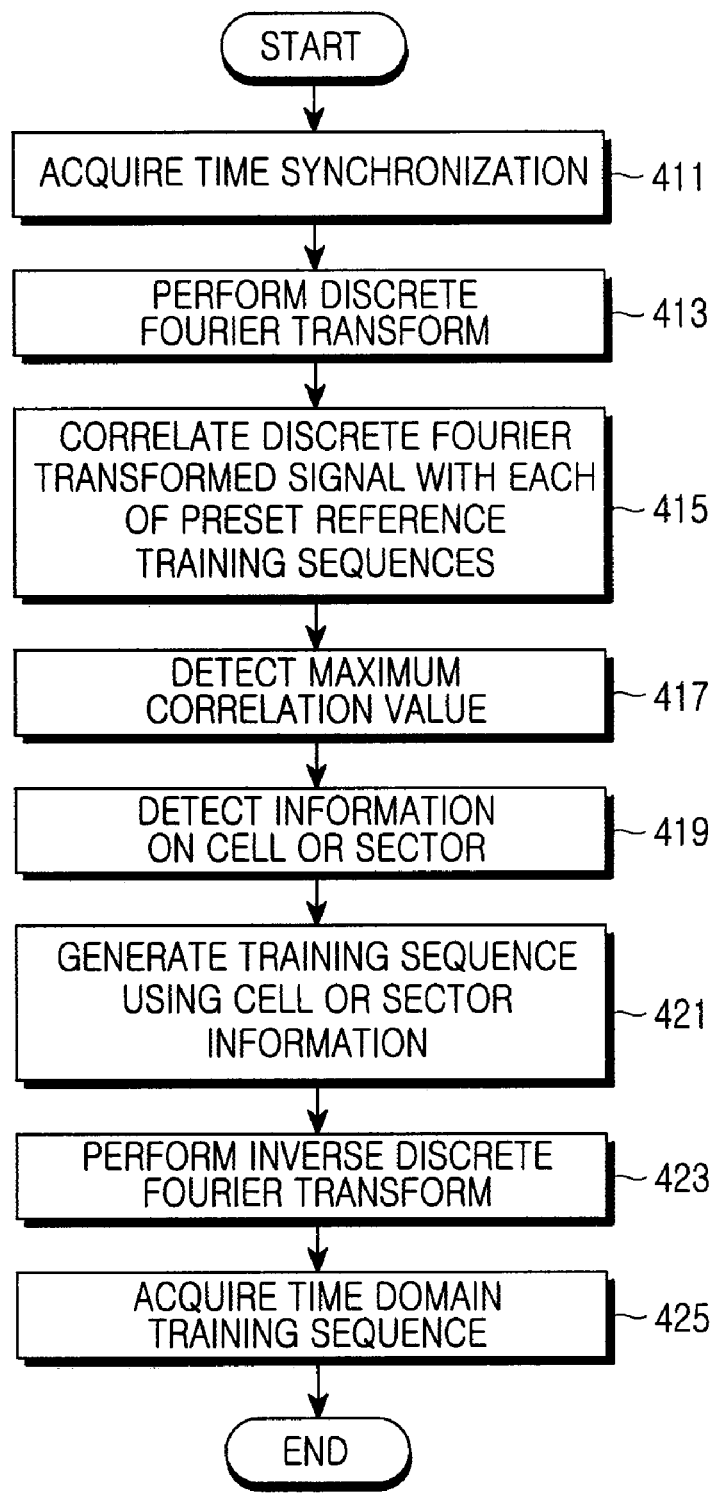
FIG. 4 is a flowchart illustrating an operation of a training sequence detector according to an exemplary embodiment of the present invention.

FIG. 4 is a flowchart illustrating an operation of a training sequence detector according to an exemplary embodiment of the present invention.

Referring to FIG. 4, in step 411, the training sequence detector 325 acquires time synchronization using a reception signal, i.e., a signal output from the A/D converter 215. In step 413, the training sequence detector 325 performs a Discrete Fourier Transform (DFT) on the reception signal. While not illustrated in FIG. 4, the training sequence detector 325 may perform a Fast Fourier Transform (FFT) on the reception signal in step 413 according to an exemplary embodiment of the invention.

In step 415, the training sequence detector 325 correlates the discrete Fourier transformed signal with each of preset reference training sequences. Here, the reception signal as a time domain signal is converted into a frequency domain signal after performing the DFT, so the preset reference training sequences are frequency domain reference training sequences. In addition, each of the preset reference training sequences is uniquely allocated to a corresponding cell or a corresponding sector. Thus, each of the preset reference training sequences may be used as information identifying the corresponding cell or the corresponding sector. That is, when the training sequence detector 325 detects a specific training sequence as a final training sequence, the training sequence detector 325 determines a cell or a sector to which the final training sequence is uniquely allocated as a cell or a sector in which the training sequence detector 325 is located.

In step 417, the training sequence detector 325 detects a maximum correlation value among a plurality of correlation values according to the correlation. In step 419, the training sequence detector 325 detects information on a cell or a sector in which the training sequence detector 325 is located by detecting a reference training sequence with the maximum correlation value. Hereinafter, the information on the cell or the sector in which the training sequence detector 325 is located will be referred to as 'cell or sector information'. The training sequence detector 325 determines a cell or a sector to which the detected training sequence is uniquely allocated as the cell or the sector in which the training sequence detector 325 is located.

In order to increase accuracy for detection of the cell or sector information, an operation in step 411 to step 415 may be performed during a plurality of training sequence time durations. That is, the training sequence detector 325 accumulates correlation values for each of the preset reference training sequences during the plurality of training sequence time durations, detects averaging values of the accumulated correlation values, and uses the averaging values, thereby increasing accuracy for detection of the cell or sector information.

Further, the RS may only perform an operation for receiving a signal while the training sequence detector 325 detects the cell or sector information. In this case, the RS may not perform an operation for transmitting a signal. Thus, an error probability for detecting the cell or sector information due to an echo signal is decreased.

In step 421, the training sequence detector 325 generates a training sequence using the detected cell or sector information. Here, the generated training sequence is identical to a training sequence transmitted by a transmitter, for example, a BS. Thus, the training sequence detector 325 may generate the training sequence, transmitted by the BS, without noise.

In step 423, the training sequence detector 325 performs an Inverse Discrete Fourier Transform (IDFT) on the generated training sequence. While not described in FIG. 4, the training sequence detector 325 may perform an Inverse Fast Fourier Transform (IFFT) on the generated training sequence in step 423 according to an exemplary embodiment of the invention.

In step 425, the training sequence detector 325 acquires a time domain training sequence.

In an exemplary embodiment of the present invention, a training sequence is used for an operation of the echo channel estimator 321 as illustrated in FIG. 4. As described above, when the training sequence is used, time synchronization and frequency synchronization may be acquired. In addition, the training sequence is used for identifying a cell or a sector, and is modulated using a different frequency tone and a different frequency sequence in each cell or each sector.

Therefore, when the RS is initially established, or a configuration of a cell or a sector of a BS is changed, the RS may detect a location and an echo signal of the RS using the training sequence by periods.

As is apparent from the foregoing description, according to exemplary embodiments of the present invention, a signal transmission/reception apparatus of a communication system may remove an echo signal. Further, the signal transmission/reception apparatus may remove the echo signal using the training sequence. Thus, an oscillation in the signal transmission/reception apparatus and a case where a quality of a signal transmitted by the signal transmission/reception apparatus becomes worse, are prevented from occurring.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for removing an echo signal in a signal transmission/reception apparatus of a communication system, the method comprising:
   estimating an input channel response using a training sequence;
   generating a first signal by using a first mixer to remove the input channel response from a signal output from a second mixer;
   detecting an echo channel impulse response using the first signal;
   detecting an echo signal removing coefficient using the echo channel impulse response;
   delaying the signal output from the second mixer;
   generating a second signal in which an echo signal is removed by applying the echo signal removing coefficient to the delayed signal output from the second mixer;
   removing the second signal from a reception signal using the second mixer.

2. The method of claim 1, wherein the estimating of the input channel response using the training sequence comprises acquiring the training sequence using the reception signal at a time point prior to the removing of the second signal from the reception signal using the second mixer.

3. The method of claim 2, wherein the acquiring of the training sequence using the reception signal at a time point prior to the removing of the second signal from the reception signal using the second mixer comprises:
   performing a discrete Fourier transform on the reception signal at a time point prior to the removing of the second signal from the reception signal using the second mixer;

correlating the discrete Fourier transformed signal with
each of preset reference training sequences;
detecting a maximum correlation value among a plurality
of correlation values according to the correlation;
acquiring one of cell and sector information in which a
signal transmission/reception apparatus is located using
the maximum correlation value;
generating a training sequence transmitted by a transmitter
of the communication system using the one of cell and
sector information; and
acquiring the training sequence by performing an inverse
discrete Fourier transform on the generated training
sequence.

4. The method of claim 2, wherein the acquiring of the
training sequence using the reception signal at the time point
prior to the removing of the second signal from the reception
signal using the second mixer comprises:
performing a fast Fourier transform on the reception signal
at the time point prior to the removing of the second
signal from the reception signal using the second mixer;
correlating the fast Fourier transformed signal with each of
preset reference training sequences;
detecting a maximum correlation value among a plurality
of correlation values according to the correlation;
acquiring one of cell and sector information in which a
signal transmission/reception apparatus is located using
the maximum correlation value;
generating a training sequence transmitted by a transmitter
of the communication system using the one of cell and
sector information; and
acquiring the training sequence by performing an inverse
fast Fourier transform on the generated training
sequence.

5. The method of claim 2, wherein the acquiring of the
training sequence using the reception signal at the time point
prior to the removing of the second signal from the reception
signal using the second mixer comprises:
generating a third signal by performing a discrete Fourier
transform on the reception signal at the time point prior
to the removing of the second signal from the reception
signal using the second mixer;
correlating the third signal with each of preset reference
training sequences;
generating a fourth signal by performing the discrete Fourier
transform on the reception signal at a time point
corresponding to the removing of the second signal from
the reception signal using the second mixer;
correlating the fourth signal with each of the preset reference
training sequences;
accumulating a plurality of correlation values according to
the correlation for the fourth signal to a plurality of
correlation values according to the correlation for the
third signal;
detecting average values for each of the accumulated correlation
values;
detecting a maximum value among the average values;
acquiring one of cell and sector information in which a
signal transmission/reception apparatus is located using
the maximum value;
generating a training sequence transmitted by a transmitter
of the communication system using the one of cell and
sector information; and
acquiring the training sequence by performing an inverse
discrete Fourier transform on the generated training
sequence.

6. The method of claim 2, wherein the acquiring of the
training sequence using the second reception signal at the time point prior to the removing of the second signal from the
reception signal using the second mixer comprises:
generating a third signal by performing a fast Fourier transform
on the reception signal at the time point prior to the
removing of the second signal from the reception signal
using the second mixer;
correlating the third signal with each of preset reference
training sequences;
generating a fourth signal by performing the fast Fourier
transform on the reception signal at a time point corresponding
to the removing of the second signal from the
reception signal using the second mixer;
correlating the fourth signal with each of the preset reference
training sequences;
accumulating a plurality of correlation values according to
the correlation for the fourth signal to a plurality of
correlation values according to the correlation for the
third signal;
detecting average values for each of the accumulated correlation
values;
detecting a maximum value among the average values;
acquiring one of cell and sector information in which a
signal transmission/reception apparatus is located using
the maximum value;
generating a training sequence transmitted by a transmitter
of the communication system using the one of cell and
sector information; and
acquiring the training sequence by performing an inverse
fast Fourier transform on the generated training
sequence.

7. The method of claim 1, wherein the training sequence
identifies one of a cell and a sector.

8. The method of claim 7, wherein the training sequence is
modulated using at least one of a different frequency tone and
a different frequency sequence in each of one of the cell and
the sector.

9. An apparatus to remove an echo signal in a signal transmission/reception
apparatus of a communication system, the
apparatus comprising:
an input channel estimator to estimate an input channel
response using a training sequence;
a first mixer to generate a first signal by removing the input
channel response from a signal output from a second
mixer;
an echo channel estimator to detect an echo channel
impulse response using the first signal, and detect an
echo signal removing coefficient using the echo channel
impulse response;
a delay generator to delay the signal output from the second
mixer;
an echo signal remover to generate a second signal in
which an echo signal is removed by applying the echo
signal removing coefficient to the delayed signal output
from the second mixer; and
the second mixer to remove the second signal from a reception
signal.

10. The apparatus of claim 9, further comprising a training
sequence detector for acquiring the training sequence using
the reception signal at a time point prior to a time point when
the second mixer removes the second signal from the reception
signal.

11. The apparatus of claim 10, wherein the training
sequence detector performs a discrete Fourier transform on
the reception signal at the time point prior to the time point
when the second mixer removes the second signal from the
reception signal, correlates the discrete Fourier transformed
signal with each of preset reference training sequences, detects a maximum correlation value among a plurality of correlation values according to the correlation, acquires one of cell and sector information in which a signal transmission/reception apparatus is located using the maximum correlation value, generates a training sequence transmitted by a transmitter of the communication system using the one of cell and sector information, and acquires the training sequence by performing an inverse discrete Fourier transform on the generated training sequence.

12. The apparatus of claim 10, wherein the training sequence detector performs a fast Fourier transform on the reception signal at the time point prior to the time point when the second mixer removes the second signal from the reception signal, correlates the fast Fourier transformed signal with each of preset reference training sequences, detects a maximum correlation value among a plurality of correlation values according to the correlation, acquires one of cell and sector information in which a signal transmission/reception apparatus is located using the maximum correlation value, generates a training sequence transmitted by a transmitter of the communication system using the one of cell and sector information, and acquires the training sequence by performing an inverse fast Fourier transform on the generated training sequence.

13. The apparatus of claim 10, wherein the training sequence detector generates a third signal by performing a discrete Fourier transform on the reception signal at the time point prior to the time point when the second mixer removes the second signal from the reception signal, correlates the third signal with each of preset reference training sequences, generates a fourth signal by performing the discrete Fourier transform on the reception signal at a time point corresponding to a time point when the second mixer removes the second signal from the reception signal, correlates the fourth signal with each of the preset reference training sequences, accumulates a plurality of correlation values according to the correlation for the fourth signal to a plurality of correlation values according to the correlation for the third signal, detects average values for each of the accumulated correlation values, detects a maximum value among the average values, acquires one of cell and sector information in which a signal transmission/reception apparatus is located using the maximum value, generates a training sequence transmitted by a transmitter of the communication system using the one of cell and sector information, and acquires the training sequence by performing an inverse discrete Fourier transform on the generated training sequence.

14. The apparatus of claim 10, wherein the training sequence detector generates a third signal by performing a fast Fourier transform on the reception signal at the time point prior to the time point when the second mixer removes the second signal from the reception signal, correlates the third signal with each of preset reference training sequences, generates a fourth signal by performing the fast Fourier transform on the reception signal at a time point corresponding to a time point when the second mixer removes the second signal from the reception signal, correlates the fourth signal with each of the preset reference training sequences, accumulates a plurality of correlation values according to the correlation for the fourth signal to a plurality of correlation values according to the correlation for the third signal, detects average values for each of the accumulated correlation values, detects a maximum value among the average values, acquires one of cell and sector information in which a signal transmission/reception apparatus is located using the maximum value, generates a training sequence transmitted by a transmitter of the communication system using the one of cell and sector information, and acquires the training sequence by performing an inverse fast Fourier transform on the generated training sequence.

15. The apparatus of claim 9, wherein the training sequence identifies one of a cell and a sector.

16. The apparatus of claim 15, wherein the training sequence is modulated using at least one of a different frequency tone and a different frequency sequence in each of one of the cell and the sector.

* * * * *